R. JOHNSON.
CALIPERS.
APPLICATION FILED FEB. 14, 1921.
1,410,189.
Patented Mar. 21, 1922.
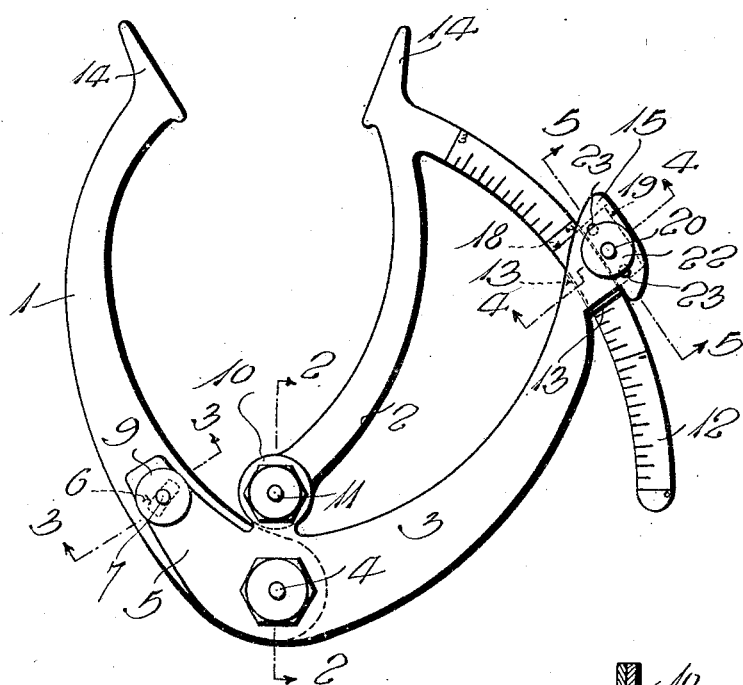
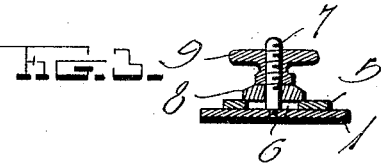
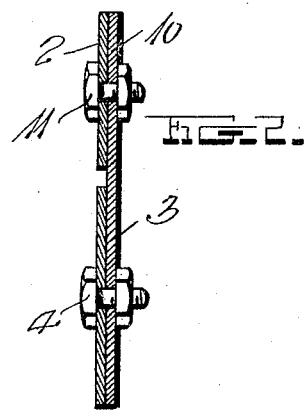
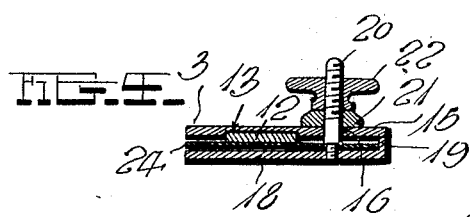
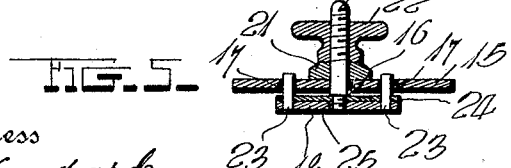
Witness
H. Woodard
Inventor
R. JOHNSON
By H. A. Wilson
Attorneys

UNITED STATES PATENT OFFICE.

ROBERT JOHNSON, OF NEW BEDFORD, MASSACHUSETTS.

CALIPERS.

1,410,189. Specification of Letters Patent. Patented Mar. 21, 1922.

Application filed February 14, 1921. Serial No. 444,828.

*To all whom it may concern:*

Be it known that I, ROBERT JOHNSON, a citizen of the United States, residing at New Bedford, in the county of Bristol and State of Massachusetts, have invented certain new and useful Improvements in Calipers; and I do declare the following to be a full, clear, and exact description of the invention, such as will enable others skilled in the art to which it appertains to make and use the same.

This invention relates to an improved pair of calipers and one object of the invention is to provide a pair of calipers having an improved construction including a relatively stationary work-engaging arm, a guiding arm, and a relatively movable work-engaging arm, the relatively movable work-engaging arm being provided with a gaging arm slidably connected with the guiding arm and the guiding arm being pivotally connected with the relatively stationary work-engaging arm and the work-engaging arm and guiding arm releasably held in a set position.

Another object of the invention is to provide improved means for slidably connecting the gaging arm with the guiding arm so that the gaging arm may be readily moved but may be frictionally held in a set position.

Another object of the invention is to provide improved means for pivotally mounting the relatively movable work-engaging arm between the guiding arm and the relatively stationary work-engaging arm.

Another object of the invention is to so construct the calipers that the parts thereof may be formed principally by casting from sheet metal thus permitting the calipers to be cheaply produced.

This invention is illustrated in the accompanying drawings, wherein:

Figure 1 is a top plan view of the improved calipers with the movable arm swung away from the stationary arm.

Figure 2 is a sectional view taken along the line 2—2 of Fig. 1.

Figure 3 is a sectional view taken along the line 3—3 of Fig. 1.

Figure 4 is a sectional view taken along the line 4—4 of Fig. 1.

Figure 5 is a sectional view taken along the line 5—5 of Fig. 1.

The improved calipers includes a relatively stationary work-engaging arm 1, a relatively movable work-engaging arm 2 and a guiding arm 3. The guiding arm is pivotally connected with the relatively stationary work-engaging arm by means of a bolt 4 and this guiding arm is provided with an extended end portion 5 having a transversely extending slot 6 formed therein to receive a threaded pin 7 which is carried by the relatively stationary work-engaging arm 1. A washer 8 is placed upon this stem or pin 7 and engaged by a securing nut 9 so that when the securing nut 9 is tightened, the washer will be brought into tight binding engagement with the extended end portion 5 of the guiding arm and thus securely hold the guiding arm and stationary work engaging arm in a set position. A side arm extends from the guiding arm 3 and forms a bearing 10 with which the movable work-engaging arm 2 is pivotally connected by means of a pivot bolt 11 which bolt will be loosened when it is desired to adjust the calipers and after the desired adjustment has been made the bolt may be tightened to securely but releasably hold the movable work-engaging arm in a set position. It should be noted that the bearing 10 is placed in alinement with the longitudinal axis of the calipers so that when the movable arm is swung upon its pivot, the gaging arm 12 carried by the movable work-engaging arm may move easily through the groove or pocket 13 formed in the free end portion of the guiding arm 3. This gaging arm is arcuate and will have gage markings thereon, the gage markings being preferably in inches and fractions thereof which will be graded according to the fineness of the work to be measured by means of the calipers. The edge portion 13 of the guiding arm has been beveled as shown in Fig. 1 so that the gage may be easily read, it being understood that the beveled edge will move along the gaging arm 12 and correctly indicate the distance between the heads 14 of the two work-engaging arms 1 and 2. With the beveled edge 13 at the zero mark of the gage, the heads 14 of the two arms are supposed to be in contact. If, however, it is found that the heads contact too soon or not soon enough, this can be readily corrected by loosening the securing nut 9 and bringing the heads together with the beveled edge 13 at the zero mark. The securing nut 9 can then be tightened and the calipers will be properly set for use. In order to permit the movable arm to be secured in a set position, there has been provided a clamp which is shown in detail in Figs. 4 and 5. Referring to these figures, it will be seen that the head 15 of the guiding arm has been provided with an opening 16 and upon opposite sides of the opening 16, with openings 17. The clamp is provided with a base plate 18 which extends across the groove or seat 13 beneath the gaging arm 12 as shown in Fig. 4 and is provided at its outer end with a shield 19 which engages the underface of the head 15 and forms a fulcrum upon which the clamp may swing. A threaded stem 20 is carried by this base plate and extends through the opening 16 and carries a washer 21 and securing nut 22 which will be tightened when it is desired to have the movable arm 2 held against movement. Pins 23 are carried by this base plate and slidably passed through the openings 17 so that when the securing nut is tightened, the base plate will be prevented from turning. It will thus be seen that the nut can be tightened without any danger of the base plate of the clamp moving out of the proper position. A resilient friction strip 24 is placed upon the upper face of this base plate 18 and provided with openings to receive the pins 23 and with an opening between the openings receiving the pins 23 so that the reduced and threaded end portion of the stem 20 may be passed through the friction plate and screwed into the threaded opening 25 formed in the base plate of the clamp. When this stem is tightened, the friction plate will be securely held in place as shown in Fig. 4 and will extend beneath and frictionally engage the underface of the gaging arm 12. When the securing nut 22 is tightened, the friction plate will be brought into tight binding engagement with the gage arm.

When the calipers are in use, they will be assembled as shown and after the relatively stationary work-engaging arm has been properly set with respect to the guiding arm as previously explained, the securing nut 9 will be tightened. With the heads 14 of the work-engaging arm contacting, the beveled edge 13 will be positioned at the zero mark of the gage arm and as the movable arm is swung away from the stationary arm and toward the guiding arms, the gaging arm will move through the seat or groove 13 with the scale markings upon this gaging arm indicating the amount the heads 14 have been moved apart. After the arms 1 and 2 have been moved apart the proper amount, the movable arm may be securely but releasably held in a set position by tightening of the bolt 11 or by tightening of the nut 22 so that the friction strip 24 will very tightly engage the gaging arm instead of simply engaging the gaging arm a sufficient amount to permit sliding of this arm but prevent accidental sliding movement of the arm.

I claim:

1. A pair of calipers comprising a guiding arm having a transversely extending pocket and a relatively stationary work-engaging arm, a relatively movable work-engaging jaw pivotally mounted between the guiding arm and stationary arm, an arcuate gaging arm extending from said jaw through the pocket in said guiding arm, and clamping means carried by said guiding arm and including a resilient strip engaging said gaging arm to frictionally hold the same against sliding movement.

2. The structure of claim 1 having the clamp in the form of a rigid base having a fulcrum at one end engaging the underface of the guiding arm and extending across the pocket formed therein, a resilient plate between the base and guiding arm and engaging the gaging arm, a threaded stem extending from the base through the resilient plate and guiding arm, a securing nut carried by said stem and engaging the upper face of said guiding arm, and means for holding the base and plate against turning when said nut is tightened.

3. A pair of calipers comprising a relatively stationary work-engaging arm, a guiding arm having a pocket adjacent its free end and having a side extension forming a bearing at its junction with said stationary work-engaging arm, a relatively movable work-engaging arm pivoted to said bearing, an arcuate gaging arm extending from the free end portion of said movable arm through the pocket in the free end portion of said guiding arm, and clamping means carried by the guiding arm and including a resilient strip engaging said gaging arm to frictionally hold the same against sliding movement.

4. A pair of calipers comprising a relatively stationary work-engaging arm and a guiding arm pivoted to the work-engaging arm and having a pocket, one of said arms being extended beyond its pivot point and provided with a transverse slot, a pin carried by the second arm and extending through the slot and carrying means for engaging the extended end portion of the first arm to releasably hold the arms against movement, a bearing extending from the pivoted end of the guiding arm and extending between said arms, a relatively movable work-engaging arm pivoted to said bearing, an arcuate gaging arm extending from the free end portion of the movable work-engaging arm and extending through the pocket in the guiding arm, and clamp means carried by the guiding arm and including a resilient strip engaging said gaging arm to frictionally hold the same against movement in the pocket.

5. A pair of calipers comprising a guiding arm having a pocket, a stationary work-engaging arm, a movable work-engaging arm pivotally mounted between the stationary arm and guiding arm, a gauge arm extending from said movable arm through the pocket of said guiding arm, and means in said pocket for frictionally engaging said gauge arm and releasably holding the movable arm in a set position.

6. A pair of calipers comprising a stationary work-engaging arm, a guiding arm, a movable work-engaging arm pivotally mounted between the stationary arm and the guiding arm, a gauging arm carried by said movable arm and extending across said guiding arm, and resilient means engaging said gauging arm and frictionally holding said movable arm in a set position.

In testimony whereof I have hereunto set my hand.

ROBERT JOHNSON.